(12) United States Patent
Ohara et al.

(10) Patent No.: US 8,341,398 B2
(45) Date of Patent: Dec. 25, 2012

(54) COMMUNICATION SYSTEM, NETWORK DEVICE AND PROGRAM

(75) Inventors: Kiyotaka Ohara, Aichi (JP); Masafumi Miyazawa, Aichi (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 980 days.

(21) Appl. No.: 11/730,037

(22) Filed: Mar. 29, 2007

(65) Prior Publication Data

US 2007/0234055 A1    Oct. 4, 2007

(30) Foreign Application Priority Data

Mar. 31, 2006    (JP) .................................. 2006-098923

(51) Int. Cl.
*H04L 29/00* (2006.01)
(52) U.S. Cl. ........ 713/156; 713/157; 713/175; 713/185; 380/282
(58) Field of Classification Search .................. 713/156, 713/157, 175, 185; 380/282
See application file for complete search history.

(56) References Cited

U.S. PATENT DOCUMENTS

| | | | |
|---|---|---|---|
| 5,680,458 A | 10/1997 | Spelman et al. | |
| 7,639,820 B2 * | 12/2009 | Saito | 380/287 |
| 2002/0023216 A1 | 2/2002 | Noguchi et al. | |
| 2003/0105963 A1 | 6/2003 | Slick et al. | |
| 2004/0086115 A1 * | 5/2004 | Laih et al. | 380/30 |
| 2006/0294366 A1 * | 12/2006 | Nadalin et al. | 713/156 |
| 2008/0043278 A1 * | 2/2008 | Suzuki | 358/1.15 |

FOREIGN PATENT DOCUMENTS

| | | |
|---|---|---|
| JP | 6-244832 | 9/1994 |
| JP | 9-97238 | 4/1997 |
| JP | 2001-507528 | 6/2001 |
| JP | 2002-26899 | 1/2002 |
| JP | 2003-224561 | 8/2003 |
| JP | 2005-141317 A | 6/2005 |
| JP | 2005-269558 | 9/2005 |

OTHER PUBLICATIONS

Japanese Official Action dated Nov. 5, 2009 with English translation.

* cited by examiner

*Primary Examiner* — Jeffrey Pwu
*Assistant Examiner* — Helai Salehi
(74) *Attorney, Agent, or Firm* — Scully, Scott, Murphy & Presser, P.C.

(57) ABSTRACT

There is provided a communication system in which a network device and an information processing device are communicatably connected to each other through a network. The network device comprises a certificate providing unit to transmit an electronic certificate to the information processing device through the network; and a printing unit configured to print an image of a public key corresponding to the electronic certificate. The information processing device comprises: a certificate reception unit to receive the electronic certificate from the certificate providing unit through the network; an image output unit to generate and output an image of the public key described in the received electronic certificate; and an installation unit configured to install the electronic certificate onto the information processing device in response to a fact that the generated image of the public key is output by the image output unit and a command for installation of an electronic certificate is received.

17 Claims, 11 Drawing Sheets

```
<<NETWORK CONFIGURATION>>
<Node Type>              HM-5000
<Node Firmware Ver.>     Firmware Ver. 1. 01 (02. 09. 06)
<Ethernet Address>       **-**-**-**-**-**
<Node name>              PRN *******1

<IP Address>             ***.***.***.***    (set manually)
<Subnet Mask>            255. 255. 0. 0
<IP Gateway>             ***.***.***.***
<IP Config>              STATIC
<Boot Tries>             3

<Ethernet Link Mode>     Auto
<Etherent Link Status>   Link OK, 100baseTX FDX  #Link Drops=10

<Network Statistics>
Packets Received         33894102
Bytes Received           676331324
Bad Packets Received     0
Receiver error mask      0
Receiver overruns        191972
Packets Transmitted      705047
Bytes Transmitted        68932771
Packet Collisions        0
Transmit packet fail     4210
Transmit error mask      2
```

<CA Digital Certificate Public key>

| | | | | | |
|---|---|---|---|---|---|
| 30 81 89 02 | 81 81 00 f4 | 50 c0 6d [c2] | 8e 85 a5 8a | 71 a8 8e c4 | 29 2c 90 d0 |
| 0f 21 04 d5 | 4f 06 86 f1 | 95 04 c0 c0 | d1 d0 f7 f1 | f0 0a 9c 84 | 70 1d 7b c4 |
| 72 11 03 02 | e8 34 [ba] fb | b6 f8 12 6a | 3b 7d 07 2c | 00 25 f2 85 | a6 c7 cf 72 |
| a2 a4 0b 2c | e0 39 f2 73 | c273 37 49 | 98 a0 16 82 | b5 1a 7e a9 | 44 74 ba 31 |
| 7e [3c] 83 be | ad 39 bd ab | 8f 25 5f 0e | [c4] 05 7a 57 | d8 ca f6 a2 | 80 15 0e f0 |
| b6 2f 11 c1 | 60 74 7b d1 | 93 49 bb ac | e6 da 09 02 | 03 01 00 01 | |

FIG. 5

Print configuration page of printer.
Press "go" key of printer three times successively to print configuration page. Go to next step when print out of the configuration page is finished.

[CANCEL] [NEXT >]

FIG.8A

Select printer for which installation of CA Certificate on this PC is to be executed.

| Node Name | Node Address | Printer Name |
|---|---|---|
| PRN*****1 | *.*.*.*** | HM – 5000 |
| PRN*****2 | *.*.*.*** | HM – 5001 |
| PRN*****3 | *.*.*.*** | HM – 4000 |
| PRN*****4 | *.*.*.*** | HM – 2000 |

[CANCEL] [NEXT>]

Public key of certificate is printed on the configuration page which is printed a little while ago. Please check whether the public key on the upper side of the configuration page matches the following codes (Please check at least the framed codes on the configuration page).
If the codes on the configuration page and the following codes match with respect to each other, you are able to install the certificate onto this pc and proceed to next step. If not, there is a possibility that an ill-willed person exists on the network. Therefore, please press "cancel" key and contact an administrator.

| | | | | | |
|---|---|---|---|---|---|
| 30 81 89 02 | 81 81 00 f4 | 50 c0 6d c2 | 8e 85 a5 8a | 71 a8 8e c4 | 29 2c 90 d0 |
| 0f 21 04 d5 | 4f 06 86 f1 | 95 04 c0 c0 | d1 d0 f7 f1 | f0 0a 9c 84 | 70 1d 7b c4 |
| 72 11 03 02 | e8 34 ba fb | b6 f8 12 6a | 3b 7d 07 2c | 00 25 f2 85 | a6 c7 cf 72 |
| a2 a4 0b 2c | e0 39 f2 73 | c2 73 37 49 | 98 a0 16 82 | b5 1a 7e a9 | 44 74 ba 31 |
| 7e 3c 83 be | ad 39 bd ab | 8f 25 5f 0e | c4 05 7a 57 | d8 ca f6 a2 | 80 15 0e f0 |
| b6 2f 11 c1 | 60 74 7b d1 | 93 49 bb ac | e6 da 09 02 | 03 01 00 01 | |

CANCEL    NEXT >

Since there is a possibility that unauthorized access is conducted during installation of the certificate, installation of the certificate is denied. Tp prevent the fraud from accruing again, reporting the present situation to the administrator is recommended.

<CA Digital Certificate Public Key>

COMMUNICATION SYSTEM, NETWORK DEVICE AND PROGRAM

CROSS-REFERENCE TO RELATED APPLICATION

This application claims priority under 35 U.S.C. §119 from Japanese Patent Application No. 2006-098923, filed on Mar. 31, 2006. The entire subject matter of the application is incorporated herein by reference.

BACKGROUND

1. Technical Field

Aspects of the present invention relate to a communication system in which data communication is performed using electronic certificate.

2. Related Art

Communication systems configured to perform data communication retaining a high level of security by enabling a receiving device to check validity of information transmitted from a sending device in accordance with reliable information stored in advance in the receiving device have become widespread. An example of such a communication system is disclosed in Japanese Patent Provisional Publication No. 2005-141317A. Another example of such a communication system is configured such that data communication having a high level of security is achieved through use of an electronic certificate.

Recently, SSL (Secure Socket Layer) communication technology has been proposed as one of communication systems which use an electronic certificate. To achieve SSL data communication, a pair of a secret key and a public key is generated, and an electronic certificate for the public key is issued by a CA (Certification Authority) before the data communication is started. Then, the secret key and the electronic certificate of the public key are installed onto a server to be involved in the SSL data communication.

When an initial signal of an SSL handshake is transmitted form a client to the server on which the electronic certificate and the secret key are installed, the server transmits the electronic certificate to the client. Then, the client checks the validity of the electronic certificate transmitted from the server in accordance with a digital signature of the received electronic certificate and a CA certificate. That is, in this case, the validity of the electronic certificate is checked depending on the CA certificate which is an electronic certificate of the CA. When the client judges that the received electronic certificate is valid, the client performs data communication using a public key indicated by the electronic certificate received from the server so that confidential information can be transmitted to or received from the server.

To ensure data communication having a high level of security, it is desirable to refer issuance of electronic certificates to a third party serving as a CA. However, use of a third party as a CA increases cost of the communication system. For this reason, in a small network system, a single device capable of serving as a CA and a server is frequently adopted.

SUMMARY

Aspects of the present invention are advantageous in that a network system, which is configured to prevent an electronic certificate from being falsified during distribution of the electronic certificate to a client and thereby to prevent the falsified electronic certificate from being installed onto the client, is provided.

BRIEF DESCRIPTION OF THE ACCOMPANYING DRAWINGS

FIG. 5 illustrates an example of a configuration page to be printed by the printing device.

FIGS. 8A, 8B, 9A and 9B illustrate dialog boxes displayed on the PC during the certificate installation reception process.

FIG. 10 illustrates an example of a public key described in a configuration page generated according to a second embodiment.

DETAILED DESCRIPTION

General Overview

Figure 1:
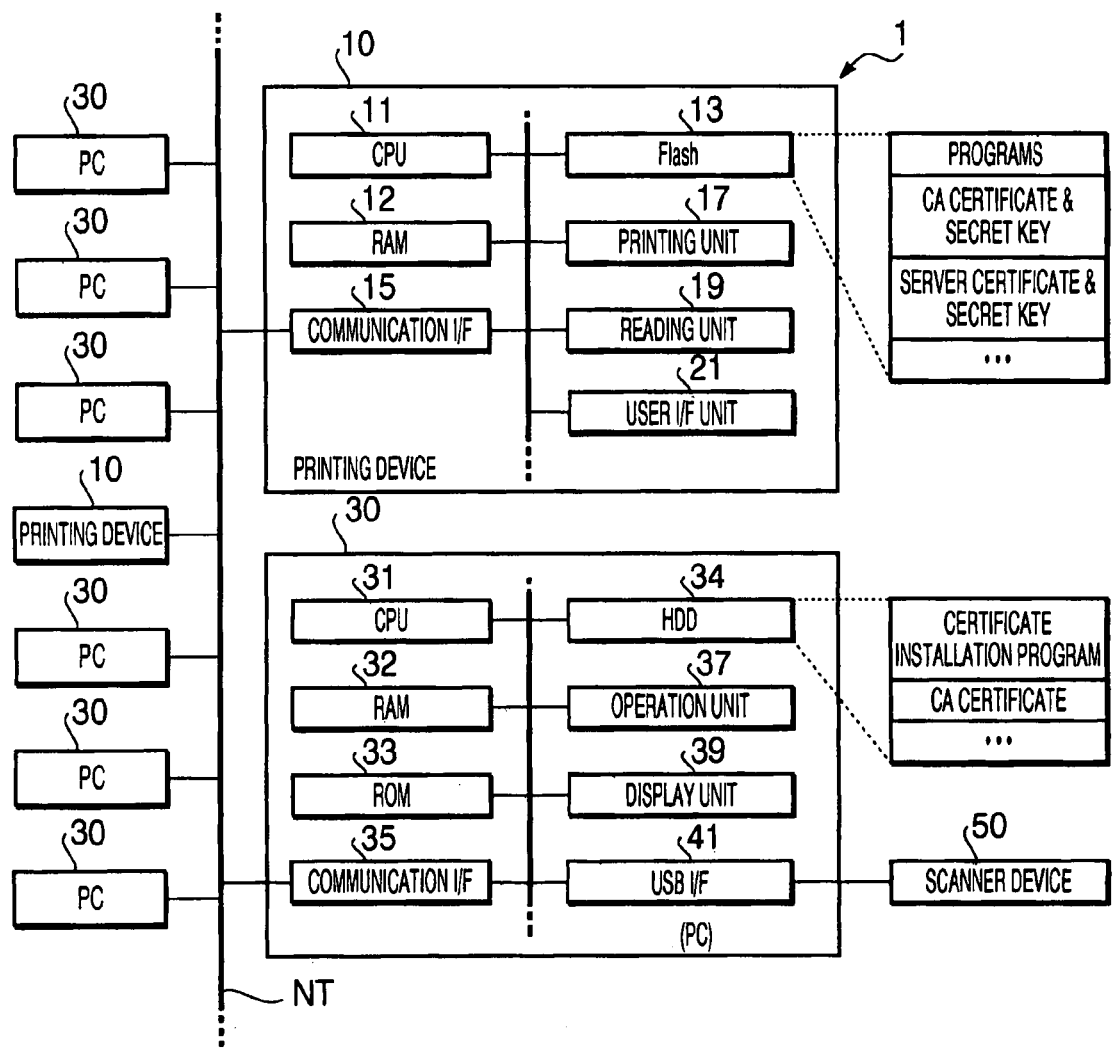
FIG. 1 is a block diagram of a communication system according to a first embodiment of the invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to an aspect of the invention, there is provided a communication system in which a network device and an information processing device are communicatably connected to each other through a network. The network device comprises: a certificate providing unit configured to transmit an electronic certificate for certifying identity of the network device to the information processing device through the network; and a printing unit configured to print an image of a public key corresponding to the electronic certificate. The information processing device comprises: a certificate reception unit configured to receive the electronic certificate from the certificate providing unit of the network device through the network; an image output unit configured to generate an image of the public key described in the electronic certificate received by the certificate reception unit and output the generated image of the public key; and an installation unit configured to install the electronic certificate onto the information processing device in response to a fact that the generated image of the public key is output by the image output unit and a command for installation of an electronic certificate is received.

Such a configuration enables a user of the information processing device to check the matching between the electronic certificate transmitted by the network device and the electronic certificate actually received by the information processing device by simply comparing the public key printed on a printed medium produced by the network device and the public key outputted by the information processing device. It is possible to install the electronic certificate of which identity of the network device is securely checked, onto the information processing device.

Even if the electronic certificate is transmitted to the information processing device through the network, it is possible to prevent the electronic certificate from being falsified in a transmission process and thereby to prevent the falsified electronic certificate from being installed onto the information processing device.

It should be noted that the configuration of the communication system makes it possible to check the identity of the electronic certificate and an ill-willed person can not decode data encrypted by the public key of the electronic certificate as long as the public key is not falsified. Therefore, it is useful to check the identity of the electronic certificate while narrowing a checking target to the public key.

It should be noted that the print data or the image data corresponding to the public key is data representing the public key or information generated in accordance with a certain algorithm from the public key.

In at least one aspect, the information processing device comprises a user interface to be operated by a user. In this case, the command for installation of an electronic certificate is inputted to the information processing device through the user interface.

In at least one aspect, the image output unit displays the image of the public key described in the electronic certificate.

In at least one aspect, the printing unit prints a hash value of the public key corresponding to the electronic certificate, as the image of the public key, and the image output unit generates a hash value of the public key described in the electronic certificate received by the certificate reception unit, as the image of the public key.

Since the user is able to check the matching between the electronic certificate transmitted by the network device and the electronic certificate actually received by the information processing device by simply comparing the hash value of the printed medium produced by the network device with the hash value outputted by the information processing device, the burden on the user for checking work can be reduced.

According to another aspect of the invention, there is provided a communication system in which a network device and an information processing device are communicatably connected to each other through a network. The network device comprises: a certificate providing unit configured to transmit an electronic certificate for certifying identity of the network device to the information processing device through the network, and a printing unit configured to print an image of a public key corresponding to the electronic certificate. The information processing device comprises: a certificate reception unit configured to receive the electronic certificate from the certificate providing unit of the network device through the network; a reading unit configured to optically read an image from an original; and an information obtaining unit configured to obtain information concerning the public key from the image which is read by the reading unit from a printed medium on which the image of the public key is printed by the printing unit of the network device. The printed medium is set on the reading unit as the original. Further, the information processing device comprises a judgment unit configured to judge whether the public key described in the electronic certificate received by the certificate reception unit matches the public key represented by the information obtained by the information obtaining unit; and an installation unit configured to install the electronic certificate onto the information processing device in response to a fact that the judgment unit judges that the public key described in the electronic certificate received by the certificate reception unit matches the public key represented by the information obtained by the information obtaining unit.

Even if the electronic certificate is transmitted to the information processing device through the network, it is possible to prevent the electronic certificate from being falsified in a transmission process and thereby to prevent the falsified electronic certificate from being installed onto the information processing device.

According to another aspect of the invention, there is provided a network device for use with an information processing device on a network. The network device comprises: a communication interface that interfaces the network device with the network; a certificate providing unit configured to transmit an electronic certificate for certifying identity of the network device to the information processing device through the communication interface; and a printing unit configured to print an image of a public key corresponding to the electronic certificate.

Even if the electronic certificate is transmitted to the information processing device through the network, it is possible to prevent the electronic certificate from being falsified in a transmission process and thereby to prevent the falsified electronic certificate from being installed onto the information processing device.

In at least one aspect, the printing unit prints a hash value of the public key corresponding to the electronic certificate, as the image of the public key.

In at least one aspect, the printing unit prints the image of the public key in such a manner that a predetermined number of codes randomly selected from all of codes forming the public key are highlighted relative to unselected codes of the public key.

Such a configuration makes it possible to lead the user to compare the selected codes on the printed medium with the corresponding codes outputted by the information processing device. Since the public key is printed such that the selected codes are distinguishable from the unselected codes, it is possible to reduce the possibility that the user loses track of the code to be compared in the checking work. It is also possible to reduce the load on the user for the checking work.

In at least one aspect, the printing unit prints the image of the public key in such a manner that each of the selected codes is assigned a mark.

In at least one aspect, the printing unit prints the image of the public key in such a manner that each of the selected codes is assigned a specific character attribute which is different from a character attribute of unselected codes.

For example, a specific font type or a specific color may be assigned to the randomly selected codes.

In at least one aspect, the printing unit prints the image of the public key in such a manner that codes forming the public key are divided into a plurality of code strings.

With this configuration, it is possible to reduce the possibility that the user loses track of the code to be compared in the checking work. It is also possible to reduce the load on the user for the checking work.

According to another aspect of the invention, there is provided a computer readable medium having computer readable instruction stored thereon, which, when executed by a processor of a network device for use with an information processing device on a network, configures the processor to perform the steps of: transmitting an electronic certificate for certifying identity of the network device to the information processing device through the network; and printing an image of a public key corresponding to the electronic certificate.

Even if the electronic certificate is transmitted to the information processing device through the network, it is possible to prevent the electronic certificate from being falsified in a transmission process and thereby to prevent the falsified electronic certificate from being installed onto the information processing device.

According to another aspect of the invention, there is provided an information processing device connectable with a network. The information processing device comprises a certificate reception unit configured to receive an electronic certificate from an external device through the network; a reading unit configured to optically read an image from an original; an information obtaining unit configured to obtain information concerning a public key from the image which is read by the reading unit from a printed medium on which the image of the public key is printed, the printed medium being set on the reading unit as the original; a judgment unit configured to judge whether the public key described in the electronic certificate received by the certificate reception unit matches the public key represented by the information obtained by the information obtaining unit; and an installation unit configured to install the electronic certificate onto the information processing device in response to a fact that the judgment unit judges that the public key described in the electronic certificate received by the certificate reception unit matches the public key represented by the information obtained by the information obtaining unit.

Even if the electronic certificate is transmitted to the information processing device through the network, it is possible to prevent the electronic certificate from being falsified in a transmission process and thereby to prevent the falsified electronic certificate from being installed onto the information processing device.

EMBODIMENT

Hereafter, embodiments according to the invention will be described with reference to the accompanying drawings.

First Embodiment

FIG. 1 is a block diagram of a communication system 1 according to a first embodiment of the invention. As shown in FIG. 1, the communication system 1 includes printing devices 10 and PCs (Personal Computers) 30 which are communicatably connected to each other via a TCP/IP based network NT. The printing device 10 is a network device (e.g., a digital multifunction device). The printing device 10 includes a CPU 11, a RAM 12 used as a work memory, a flash memory 13 in which various types of programs and data are stored, a communication interface 15, a printing unit 17, a reading unit 19, and a user interface unit 21.

The printing unit 17 is configured to form an image corresponding to inputted data on a sheet of paper in accordance with a laser printing scheme or an inkjet printing scheme. The reading unit 19 optically reads an image from an original placed on an original setting base. The user interface unit 21 includes various types of keys to be operated by a user and a display. When the programs stored in the flash memory 13 are executed by the CPU 11, the printing device 10 achieves the TCP/IP communication function, a printing function, a scanner function, a copying function.

More specifically, the printing device 10 uses settings for data communication stored in the flash memory 13 to perform data communication with other devices on the network NT. When a command for reading is inputted by the user through the user interface unit 21, the CPU 11 causes the reading unit 19 to read an image from an original and to generate image data of the obtained image, and then stores the image data temporarily (i.e., the CPU 11 carries out the scanner function). Then, the CPU 11 transmits the image data to the PC 10 which has sent a request for the image data, through the communication unit 15.

The printing device 10 further has a print server function of receiving print data (i.e., image data for printing) from the PC 10 after handshake with the PC 10 conducted in response to access from the PC 10 and printing an image corresponding to the print data on a sheet of paper through the printing unit 17.

The printing device 10 further has a function of performing SSL data communication. With this SSL data communication function, the printing device 10 performs a SSL handshake in response to access to a port for encrypted data communication and conducts negotiations with the PC 10 (which is the access source) to determine a session key to be used in the encrypted data communication. Through the encrypted data communication, the printing device 10 is able to receive print data from the PC 30 while retaining security for the print data, and to print the print data.

It is required to install a server certificate, serving as an electronic certificate for certifying the identity of the printing device 10, and a secret key corresponding to the server certificate onto the printing device 10 serving as a server. In this embodiment, the printing device 10 has a function of a CA, and therefore is able to generate a server certificate and a secret key by itself and to install them onto itself.

More specifically, the printing device 10 has a function of generating a self-sign type server certificate and a corresponding secret key. When a command for generating a server certificate and a secret key is inputted by a user to the printing device 10 through the user interface 21, the printing device 10 generates a pair of a public key and a secret key and generates a self-sign type server certificate (having a digital signature generated by the secret key) describing the public key. Then, the printing device 10 registers the server certificate and the secret key in the flash memory 13. The installation of the server certificate and the secret key is thus finished.

Since the server certificate is a self-sign type, the server certificate also serves as a CA certificate. That is, the server certificate and the secret key generated as above are installed onto the printing device 10 as a CA certificate and a corresponding secret key, and also are installed as a server certificate (for representing the identity of the printing device 10 in the SSL data communication with the client) and a corresponding secret key.

Figure 2:
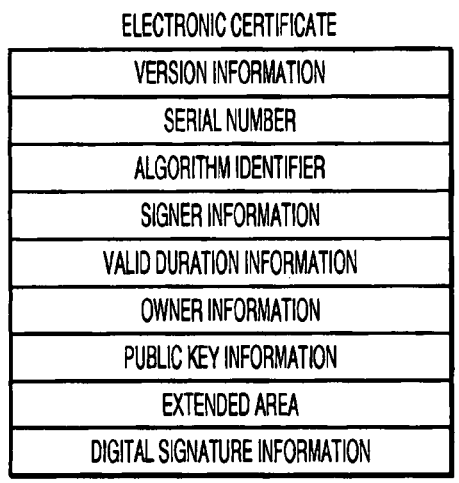
FIG. 2 illustrates a data structure of an electronic certificate issued by a printing device provided in the communication system.

FIG. 2 illustrates a data structure of an electronic certificate issued by the printing device 10. As shown in FIG. 2, the electronic certificate issued by the printing device 10 includes version information representing a version of a certificate, a serial number, an algorithm identifier, signer information representing an issuer of the certificate who made the digital signature, valid duration information representing a valid duration of the certificate, owner information representing an owner of the certificate (i.e., a receiver of the issued certificate), public key information representing a public key, and digital signature information representing a value of a digital signature.

For example, the printing device 10 issues an electronic certificate in which a duration for one year is described as the valid duration information and a node ID of the printing device 10 (e.g., an IP address) is described as a common name (CN) of the owner information.

As shown in FIG. 1, the PC 30 includes a CPU 31, a RAM 31 used as a work memory, a ROM 33 storing programs (e.g., a boot program), an HDD (hard disk drive) 34, a communication interface 35 interfacing the PC 30 with the network NT, an operation unit 37 including a keyboard and a pointing device, a display unit 39 (e.g., a liquid crystal display), and a USB I/F (interface) 41 to which a USB device can be connected.

For example, when a commend for encrypted printing is inputted by a user to the PC 30 through an application program running on the PC 30, the CPU 31 of the PC 30 executes a program for encrypted printing, and accesses a port for encrypted communication of the printing device 10 to execute an SSL handshake with the printing device 10. After the SSL handshake is finished, the PC 30 encrypts print data using a session key defined in the handshake, and transmits the print data to the printing device 10 so as to cause the printing device 10 to decrypt the print data and to print the image corresponding to the print data.

In the SSL handshake, first, an SSL initial signal (i.e., a ClientHellow message) is transmitted from the PC 30 (i.e., a client) to the printing device 10 (i.e., a server). After receiving the initial signal, the printing device 10 transmits the server certificate installed thereon to the PC 30 through the network NT. After receiving the server certificate from the printing device 10, the PC 30 judges whether the received server certificate is valid in accordance with a CA certificate which the PC 30 has obtained.

More specifically, the PC 30 judges whether the server certificate received from the printing device 10 is falsified by judging whether a hash value obtained by decoding the digital signature (see FIG. 2) described in the received server certificate based on the already obtained CA certificate is identical with a hash value obtained from information other than the digital signature in the server certificate. The PC 30 makes a final decision on whether the server certificate is falsified considering a result of the above mentioned judgment and other information (e.g., the valid duration information and owner information) in the server certificate. For example, if the hash value obtained from the digital signature described in the received server certificate is not identical with the hash value obtained from information other than the digital signature in the server certificate, the PC 30 judges that the server certificate is not valid.

If the PC 30 judges that the server certificate is not valid, the PC 30 aborts the data communication with the printing device 10. On the other hand, if the PC 30 judges that the server certificate is valid, the PC 30 executes communication with the printing device 10 in secret to determine the session key while using the public key described in the server certificate to encrypt transmission data. After the session key is determined, the PC 30 encrypts the print data in accordance with the session key determined by the SSL handshake, and transmits the print data to the printing device 10.

In order to transmit the print data in the SSL data communication from the PC 30 to the printing device 10, it is required to install in advance the CA certificate onto the PC 30 so that validation of the server certificate transmitted from the printing device 10 can be conducted properly. Since the CA certificate is important information that serves as an electronic certificate for judgment on the identity of the other end of communication line (i.e., identity of the printing device 10), it is required for the PC 30 to obtain and install the CA certificate from the printer 10 in a reliable manner.

As described in detail below, in this embodiment, the printing device 10 is provided with a function of printing the CA certificate, and the PC 30 is provided with a function of displaying the CA certificate before installing the CA certificate thereon.

Figure 3:
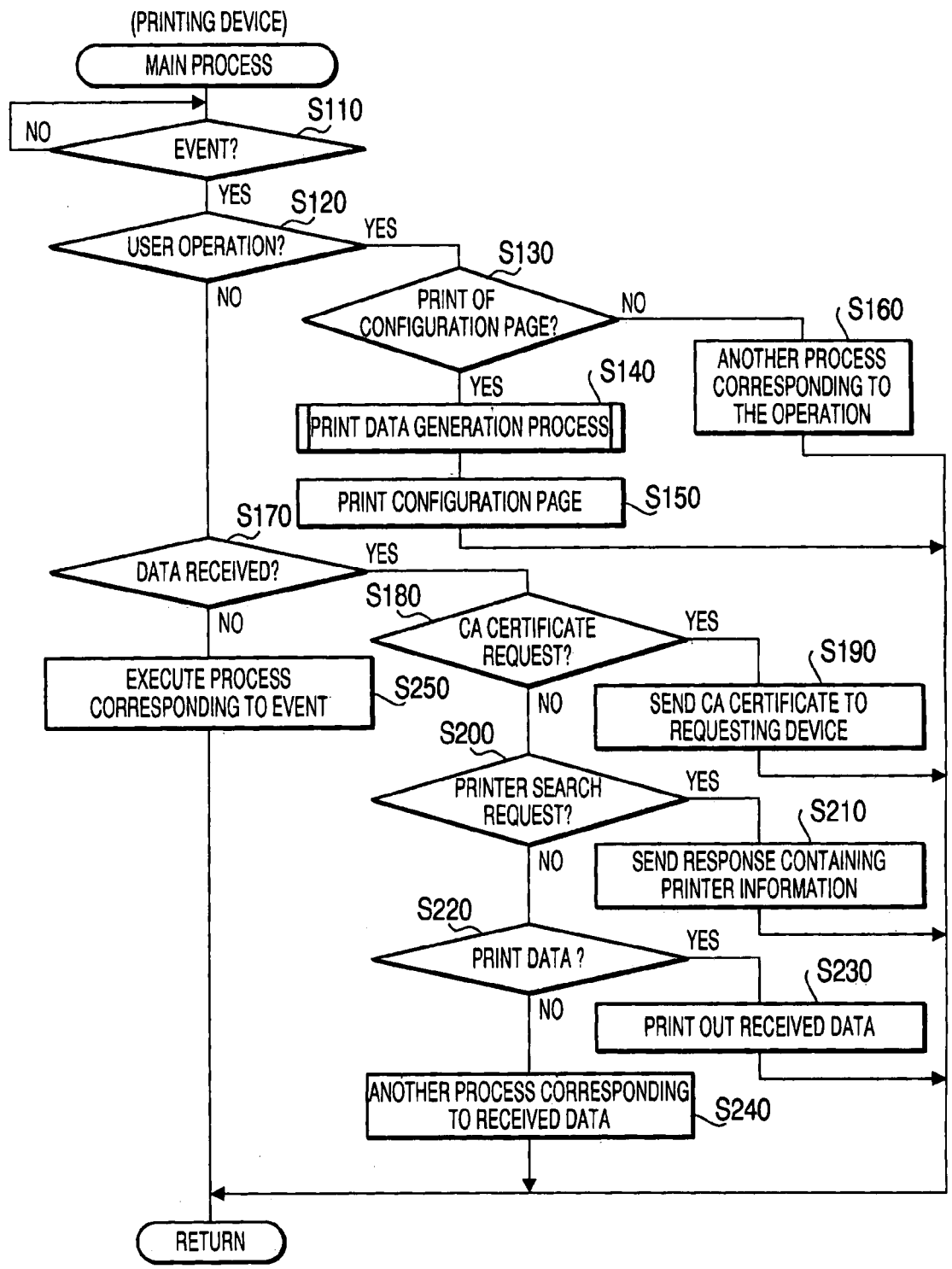
FIG. 3 is a flowchart illustrating a main process executed by the printing device.

FIG. 3 is a flowchart illustrating a main process executed under control of the CPU 11 of the printing device 10. When the main process is initiated, the CPU 11 waits until an event (e.g., an access to the printing device 10 from an external device) arises (step S110: NO). If an event arises (S 110: YES), the CPU 11 executes steps depending on the type of the event.

In step S120, the CPU 11 judges whether the event corresponds to a user operation conducted by a user through the user interface unit 21. If the event corresponds to a user operation (S 120: YES), control proceeds to step S130 where the CPU 11 judges whether the user operation is an operation for inputting a command for printing a configuration page.

If the user operation is the operation for inputting the command for printing a configuration page (S 130: YES), the CPU 11 executes a print data generation process in step S140 to generate print data corresponding to a configuration page. FIG. 5 is an example of a configuration page. Is should be noted that in FIG. 5 dashed lines and chain lines are illustrated only for the purpose of explanations of a data structure of the configuration page and they are not elements of the configuration page.

Figure 4:
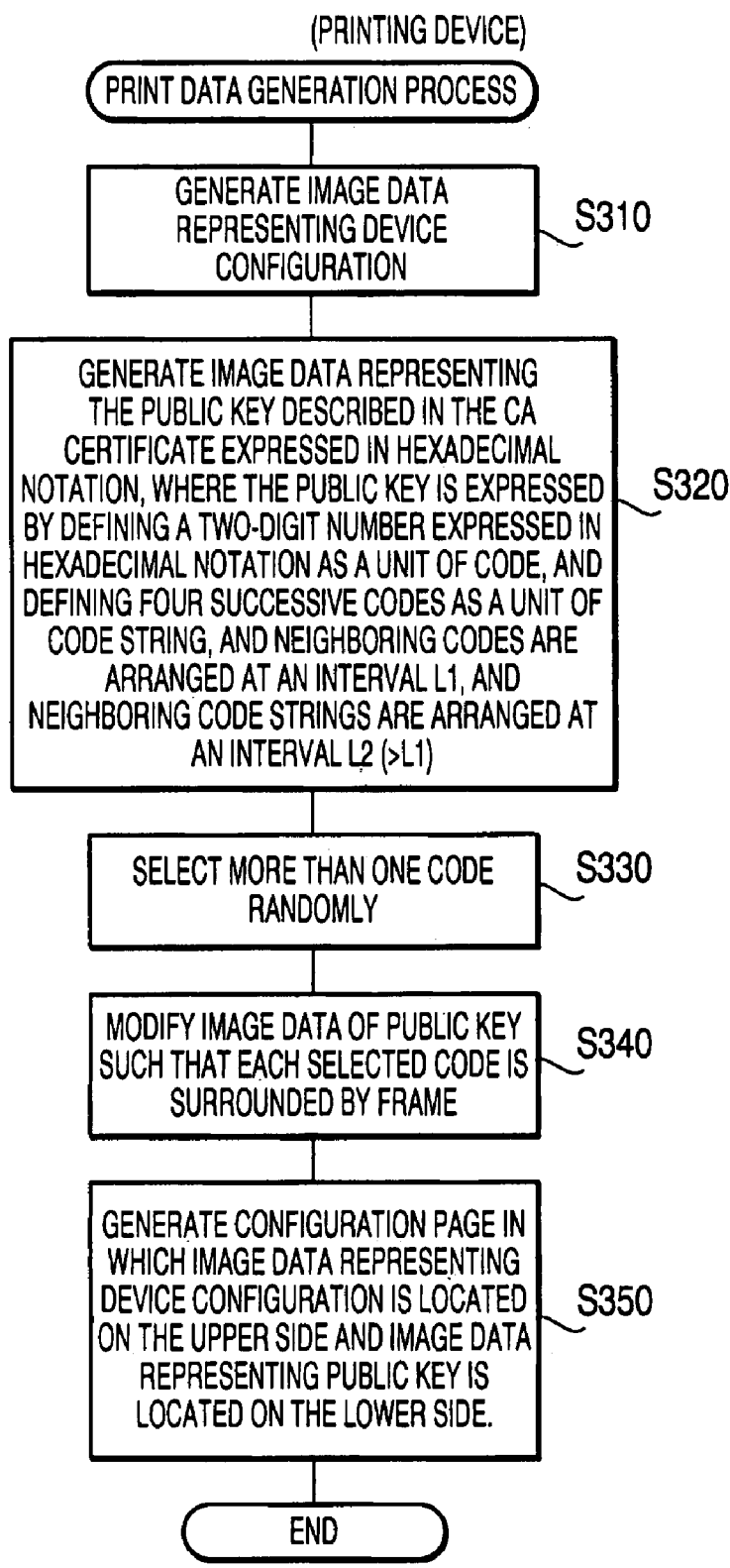
FIG. 4 is a flowchart illustrating a print data generation process executed by the printing device.

FIG. 4 is a flowchart illustrating the print data generation process executed by the printing device 10. When the print data generation process is initiated, the CPU 11 generates image data D1 (see an upper part of the configuration page in FIG. 5) representing a device configuration of the printing device 10 (step S310). For example, a node name and a node address (IP address) are contained in the device configuration.

Next, in step S320, the CPU 11 generates image data D2 representing the public key described in the CA certificate which the printing device 10 has. In the image data of the public key, the public key is expressed in hexadecimal notation. More specifically, the public key is expressed by defining a two-digit number expressed in hexadecimal notation as a unit of code, and defining four successive codes as a unit of code string. Neighboring codes are arranged at an interval L1, and neighboring code strings are arranged at an interval L2. In other words, the hexadecimal number representing the public key is expressed by more than one divided code strings in the image data D2.

Next, in step S330, the CPU 11 selects more than one codes from the public key expressed in hexadecimal notation. Then, the CPU 11 modifies the image data D2 such that each of the selected codes is surrounded by a rectangular frame as shown in the lower part of FIG. 5 (step S340). Next, in step S350, the CPU 11 generates the configuration page in which the image data D1 representing the device configuration is located on the upper side and the image data D2 representing the public key is located on the lower side. Then, the print data generation process terminates.

Referring back to FIG. 3, after the print data generation process is finished, control proceeds to step S150 where the CPU 11 prints the configuration page generated as above through the printing unit 17. Consequently, a paper document on which the configuration page is printed is generated. After step S150 is finished, the main process terminates temporarily. The printing device 10 waits until a next event arises (S110).

If the user operation is not the operation for inputting the command for printing a configuration page (S130: NO), the CPU 11 executes a process corresponding to the user operation (step S160). After step S160 is finished, the main process terminates temporarily. The printing device 10 waits until a next event arises (S110).

If the event does not correspond to a user operation (S120: NO), control proceeds to step S170. In step S170, the CPU 11 judges whether the event corresponds to a data reception event where the printing device 10 receives data from an external device through the network NT. That is, the CPU 11 judges whether the printing device 10 receives data form one of the PCs 30 through the communication interface 15.

If the CPU 11 judges that the event detected in step S110 is the data reception event (S170: YES), the CPU 11 judges whether data received in the data reception event is a CA certificate request which is a request for a CA certificate. If the received data is a CA certificate request (S180: YES), the CPU 11 transmits its own CA certificate to a source device of the CA certificate request as a response to the CA certificate request (step S190). After step S190 is finished, the main process terminates temporarily. The printing device 10 waits until a next event arises (S110).

If the received data is not a CA certificate request (S180: NO), the CPU 11 judges whether the received data is a printer search request which is broadcasted on the network NT when the PC 30 searches for printers. If the received data is a printer search request (S200: YES), the CPU 11 generates response data containing information (e.g., an IP address and a printer name) which a source device of the printer search request requires to use the printing function of the printing device 10 through the network NT, and transmits the response data to the source device of the printer search request (step S210). Then, the main process terminates temporarily.

If the received data is not a printer search request (S200: NO), the CPU 11 judges whether the received data is print data transmitted with a print command (step S220). If the received data is print data (S220: YES), the CPU 11 prints the image of the print data through the printing unit 17 (step S230). Then, the main process terminates temporarily.

If the received data is not print data (S220: NO), the CPU 11 executes a process corresponding to the type of the received data (step S240). Then, the main process terminates temporarily. The printing device 10 waits until a next event arises (S110).

Hereafter, an operation of the PC 30 is described. In the PC 30, a CA certificate installation program for supporting installation of a CA certificate onto the PC 30 has been installed. The CPU 31 of the PC 30 executes a certificate installation reception process (shown in FIGS. 6 and 7) in accordance with the CA certificate installation program to support the installation of a CA certificate onto the PC 30.

Figure 6:
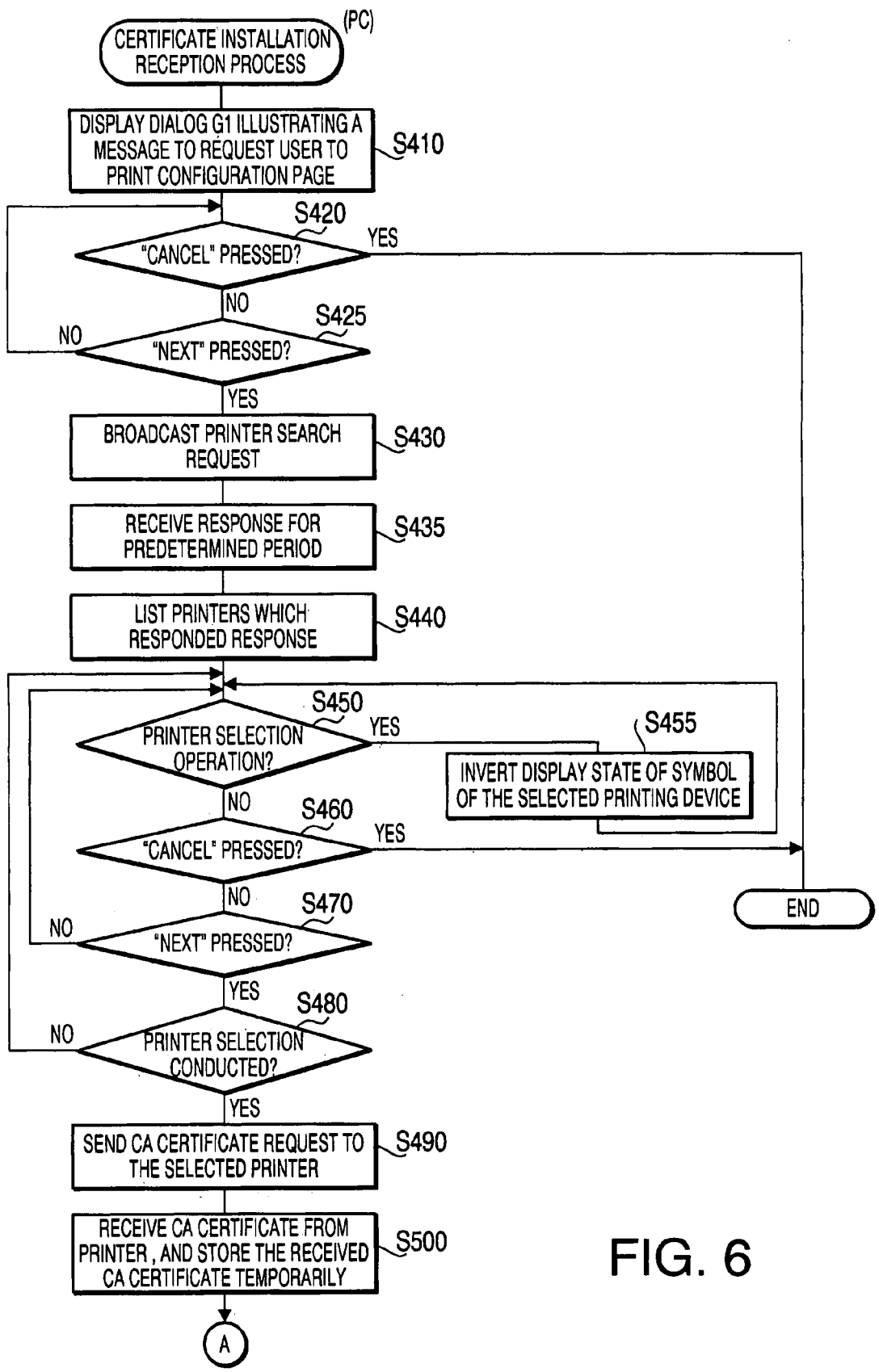
FIGS. 6 and 7 show a flowchart of a certificate installation reception process executed by a PC provided in the communication system.
Figure 7:
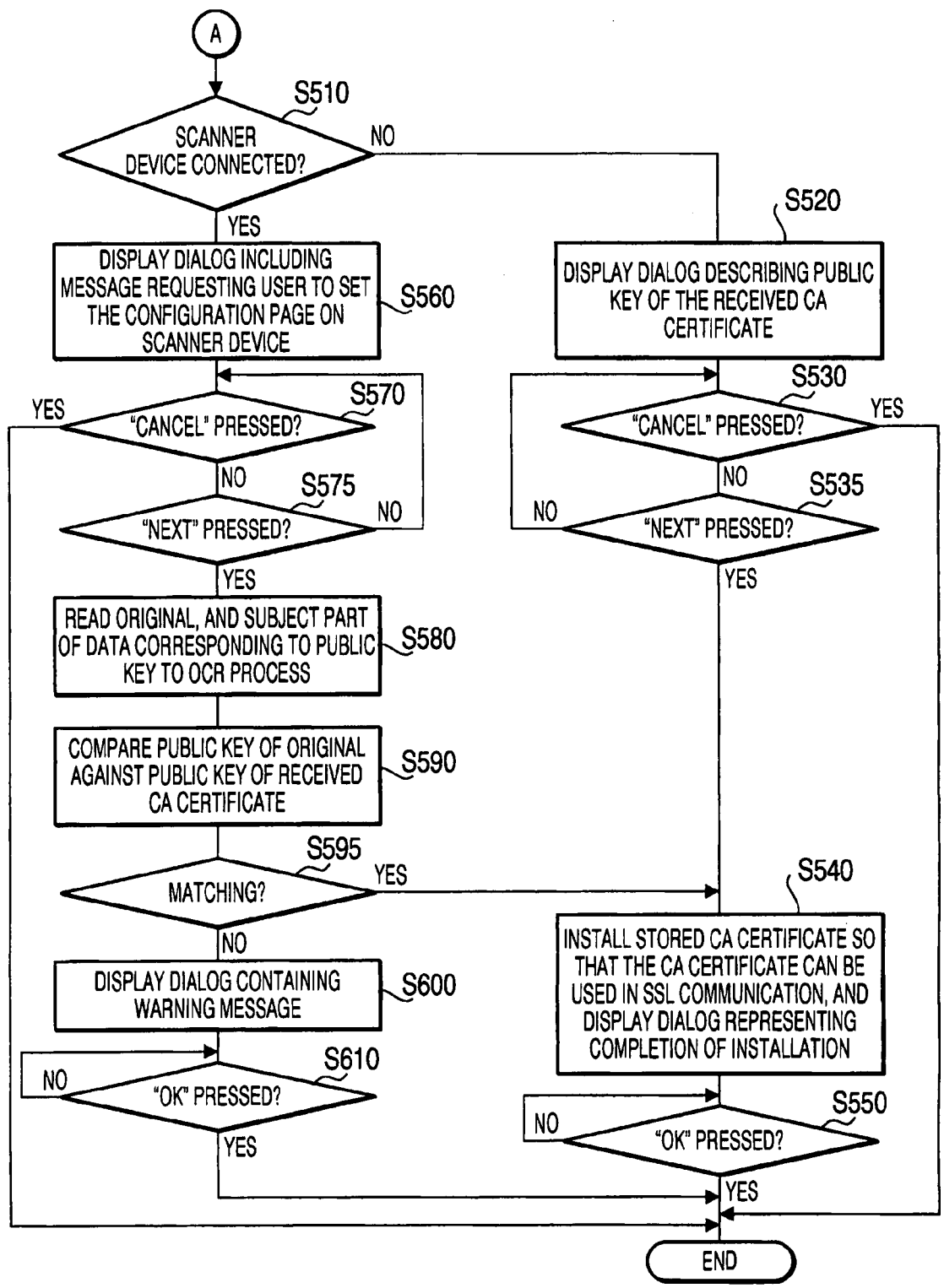

FIGS. 6 and 7 show a flowchart of the certificate installation reception process executed under control of the CPU 31 of the PC 30. FIGS. 8A, 8B, 9A and 9B illustrate examples of a dialog box displayed on the display unit 39 during the certificate installation reception process. The CPU 31 initiates the certificate installation reception process when an execution command for the certificate installation reception process is inputted by a user through the operation unit 37.

When the certificate installation reception process is initiated, the CPU 31 displays a dialog G1 (see FIG. 8A) illustrating a message to request a user to print a configuration page, on the display unit 39 (step S410). As shown in FIG. 8A, the dialog G1 includes a "cancel" key and a "next" key. After displaying the dialog G1, the CPU 31 waits until one of the "cancel" key and the "next" key is pressed (S420, S425). If the "cancel" key is pressed (S420: YES), the certificate installation reception process terminates.

If the "next" key is pressed (S425: YES), control proceeds to step S430 where the CPU 31 broadcasts a printer search request to the network NT through the communication interface 35 to search for the printing device 10. Then, the CPU 31 accepts response data to the printer search request for a certain time period (step S435). After step S435 is finished, the CPU 31 generates a dialog G2 (see FIG. 8B) in which printing devices which responded to the printer search request are listed, and displays the dialog G2 on the display unit 39. As shown in FIG. 8B, the dialog G2 is configured to allow a user to select one of the listed printing devices through the operation unit 37. Further, the dialog G2 includes a "cancel" key and a "next" key. After displaying the dialog G2, the CPU 31 waits until a user operation for selecting a printing device is conducted or one of the "cancel" key and "next" key on the dialog G2 is pressed through the operation unit 37 (S450, S460, S470).

When a user operation for selecting one of the listed printing devices is conducted (S450: YES), control proceeds to step S455 where the CPU 31 inverts a display state of a symbol (a character string) of the selected printing device on the dialog G2. Then, control returns to step S450 to wait until one of the "cancel" key and "next" key on the dialog G2 is pressed.

When the "cancel" key in the dialog G2 is pressed (S460: YES), the certificate installation reception process terminates. When the "next" key is pressed (S460: NO and S470: YES), the CPU 31 judges whether the user operation for selecting a printing device has been conducted (S480). If the user operation for selecting a printing device has not been conducted (S480: NO), control returns to step S450.

If the user operation for selecting a printing device has been conducted (S480: YES), the CPU 31 transmits a CA certificate request to the selected printing device through the communication interface 35. Then, the CPU 31 waits until a CA certificate is transmitted from the selected printer as a response to the CA certificate request, and when the CA certificate is received, the CPU 31 stores the CA certificate in the RAM 32 temporarily (step S500). Then, control proceeds to step S510 (see FIG. 7).

In step S510, the CPU 31 judges whether a scanner device 50 is connected to the USB interface 41 of the PC 30. If the scanner device 50 is not connected to the USB interface 41 (S510: NO), control proceeds to step S520 where the CPU 31 displays a dialog G3 (see FIG. 9A) in which the public key represented by the CA certificate received from the printing device 10 is described, on the display unit 39. That is, the CPU 31 generates image data representing a public key described in the CA certificate received from the printing device 10 through a program for displaying a dialog provided by an OS (operating system) running on the PC 30, and displays an image corresponding to the generated image data on the display unit 39.

As shown in FIG. 9A, the dialog G3 includes a "cancel" key and "next" key. The CPU 31 waits until the "cancel" key or "next" key is pressed by the user through the operation unit 37 (S530, S535). If the "cancel" key is pressed (S530: YES), the certificate installation reception process terminates. If the "next" key is pressed (S530: NO, S535: YES), the CPU 31 installs the CA certificate stored in the RAM 32 onto the HDD 34, assuming that the user instructed the PC 30 to install the CA certificate (step S540). That is, the CPU 31 registers the CA certificate in the HDD 34 so that the CA certificate can be used in SSL communication later.

After the installation of the CA certificate is finished, the CPU 31 displays a dialog including a message indicating that the installation is completed. This dialog has an "OK" key. The CPU 31 waits until the "OK" key on the dialog is pressed (step S550). When the "OK" key is pressed (S550: YES), the certificate installation reception process terminates.

If the scanner device 50 is connected to the USB interface 41 (S510:YES), control proceeds to step S560 where the CPU 31 displays a dialog including a message requesting a user to set the configuration page (the paper document) printed by the printer 10 on the scanner device 50. This dialog includes a "cancel" key and a "next" key. After displaying the dialog in step S560, the CPU 31 waits until one of the "cancel" key and "next" key is pressed (S570: NO, S575: NO). If the "cancel" is pressed (S570: YES), the certificate installation reception process terminates.

If the "next" key is pressed (S575: YES), control proceeds to step S580 where the CPU 31 controls the scanner device 50 to read an image from the original (the configuration page) set on the scanner device 50, and converts the read image to text information by an OCR (optical character recognition) process to obtain a train of codes (hexadecimal codes) forming the public key described in the original.

Next, in step S590, the CPU 31 compares the public key recognized in step S580 with the public key described in the CA certificate received as a response to the CA certificate request. Then, the CPU 31 judges whether the recognized public key is identical with the public key in the received CA certificate (step S595). When the recognized public key is identical with the public key in the received CA certificate (S595:YES), control proceeds to step S540 where the CPU 31 installs the CA certificate onto the PC 30. Then, control proceeds to step S550.

When the recognized public key is not identical with the public key in the received CA certificate (S595: NO), the CPU 31 displays a dialog G4 (see FIG. 9B) containing a message indicating that the received CA certificate might be falsified, on the display unit 39. As shown in FIG. 9B, the dialog G4 has an "OK" key, and after displaying the dialog G4, the CPU 31 waits until the "OK" key in the dialog G4 is pressed (S610: NO). When the "OK" key is pressed (S610: YES), the certificate installation reception process terminates.

As described above, according to the first embodiment, the CA certificate, which is an electronic certificate necessary to execute the SSL data communication and is used to check the validity of the server certificate transmitted from the printing device 30, is provided for the PC 30 through the network NT. In other words, it is possible to easily provide the CA certificate for the PC 30.

It is understood that there is a possibility that the data communication for providing the CA certificate is illegally attacked by an ill-willed person. For this reason, in this embodiment, the printing device 10 is provided with the function of printing configuration page in which the public key of the CA certificate is described. In addition, the PC 30 is provided with the function of displaying the dialog G1 having the message requesting the user to print the configuration page so that the user prints the configuration page before installation of the CA certificate onto the PC 30.

In this embodiment, when the dialog G3 for accepting the command for installing the CA certificate from the user is displayed, the public key described in the CA certificate received in advance through the network NT is displayed. Such a configuration enables the user to check whether the CA certificate received in advance by the PC 30 through the network NT is identical with the CA certificate stored on a sender (i.e., the CA certificate which the printing device 10 has) by comparing the screen, in which the CA certificate received in advance by the PC 30 through the network NT is included, with the printed configuration page on which the public key indicated by the CA certificate of the access source is described.

Therefore, according to the communication system 1, it is possible to install a valid CA certificate onto the PC 30 even if the CA certificate is provided for the PC 30 through the network NT.

It is a heavy burden for the user to check all the codes of the public key described in the printed configuration page against all the codes of the public key displayed in the dialog G3. For this reason, in this embodiment, a predetermined number of codes are randomly selected from all the codes forming the public key, and the public key is printed on the configuration page in such a manner that each of the selected codes is surrounded by a rectangular frame (see FIG. 5). Such a configuration makes it possible to cause the user to check at least the framed codes in the printed configuration page against corresponding codes in the public key of the CA certificate obtained through the network NT.

By contrast, if such indications (i.e., frames) are not presented on the printed configuration page, the user tends to check only the first part of the codes of the public key in the printed configuration page against the corresponding part of the public key in the CA certificate obtained through the network NT. However, according to the embodiment, codes of the public key to be checked are selected randomly. Therefore, it is possible to reduce a burden on the user in the checking work for checking the identity of the public keys.

In this embodiment, the codes of the public key is printed or displayed such that numbers of the public key are arranged in groups of two digits and groups of eight digits and some of the numbers are added the frames. Such a configuration makes it possible to prevent the user from being confused when the user checks the public key of the printed configuration page against the public key in the CA certificate to be installed because the frames and breakpoints between the two-digit numbers serve as markers for the checking work. In addition, it is possible to reduce the possibility that the user loses track of the code to be compared in the checking work. Therefore, it is possible to reduce the burden on the user in the checking work.

In the communication system 1, the text information of the configuration page is recognized through the OCR process. That is, the public key described in the configuration page is read optically, and the read text information is used to check matching between the CA certificate stored on the sender and the CA certificate received through the network. Such a configuration eliminates the need for conducting a visual check for checking matching between the CA certificate stored on the sender and the CA certificate received through the network. In order words, such a configuration makes it possible to reduce the burden on the user in the checking work.

Second Embodiment

Hereafter, a communication system according to a second embodiment is described. Since the feature of the second embodiment is that the selected codes of the public key in the configuration page are emphasized by changing fonts of the selected codes (see FIG. 10) in contrast to the first embodiment where the selected codes are provided the frames, only the feature of the second embodiment is described. The drawings used in the first embodiment are also used to explain the communication system according to the second embodiment.

FIG. 10 illustrates an example of the public key which is described in the configuration page such that fonts of the randomly selected codes to be checked by the user are changed relative to fonts of the coded which are not selected and are described in a normal font.

Figure 11:
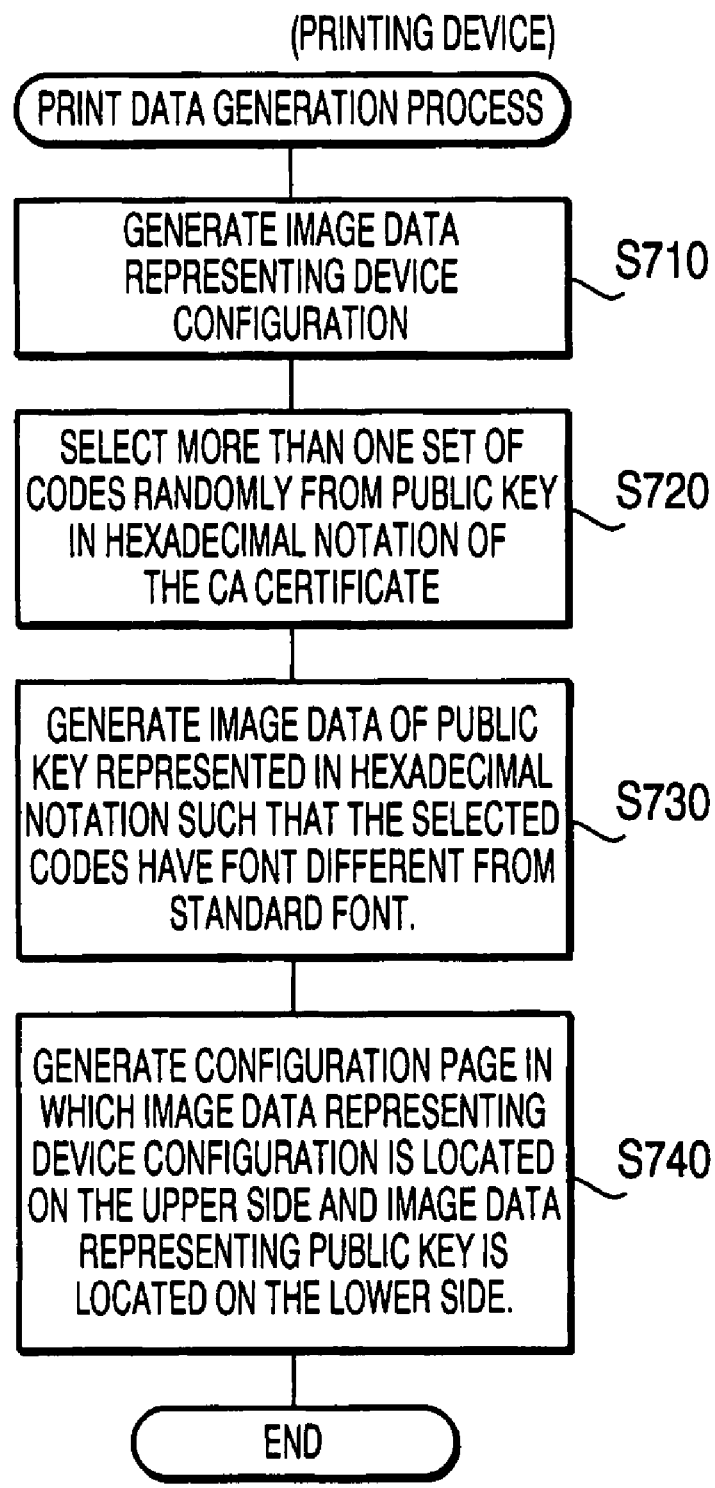
FIG. 11 is a flowchart illustrating a print data generation process executed by the printing device according to the second embodiment.

FIG. 11 is a flowchart illustrating a print data generation process to be executed under control of the CPU 11 of the printing device 10 in step S140 of the main process. When the print data generation process is started, the CPU 11 generates image data D1 (see an upper part of the configuration page in FIG. 5) representing a device configuration of the printing device 10 (step S710). Then, the CPU 11 randomly selects more than one code (e.g., four sets of codes), which is a two-digit number expressed in hexadecimal notation, from the public key described in its own CA certificate (step S720).

Next, in step S730, the CPU 11 generates image data of the public key expressed such that a specific font is used for the codes selected in step S720 and a normal font is used for the not selected codes. The special font and the normal font, which are different from each other, may be defined and stored in advance in the printing device 10. Next, in step S740, the CPU 11 generates the configuration page in which the image data D1 representing the device configuration is located on the upper side and the image data D2 representing the public key is located on the lower side. Then, the print data generation process terminates.

As described above according to the second embodiment, it is possible to print the configuration page such that the selected codes are emphasized relative to the not selected codes.

Third Embodiment

Hereafter, a communication system according to a third embodiment is described. Since the feature of the third embodiment is that a hash value of the public key is printed on the configuration page as digest of the public key in contrast to the first embodiment where all the codes of the public key is printed on the configuration page, only the feature of the third embodiment is described. As described below, the communication system according to the third embodiment enables the user to easily conduct a visual check for checking the matching between the public key of the CA certificate stored on a sender and the public key of the CA certificate obtained through the network. The drawings used in the first embodiment are also used to explain the communication system according to the second embodiment.

Figure 12A:
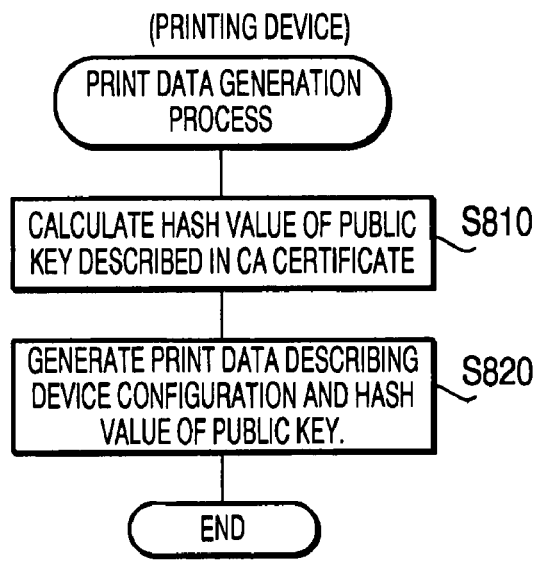
FIG. 12A is a flowchart illustrating a print data generation process executed by the printing device according to a third embodiment.
Figure 12B:
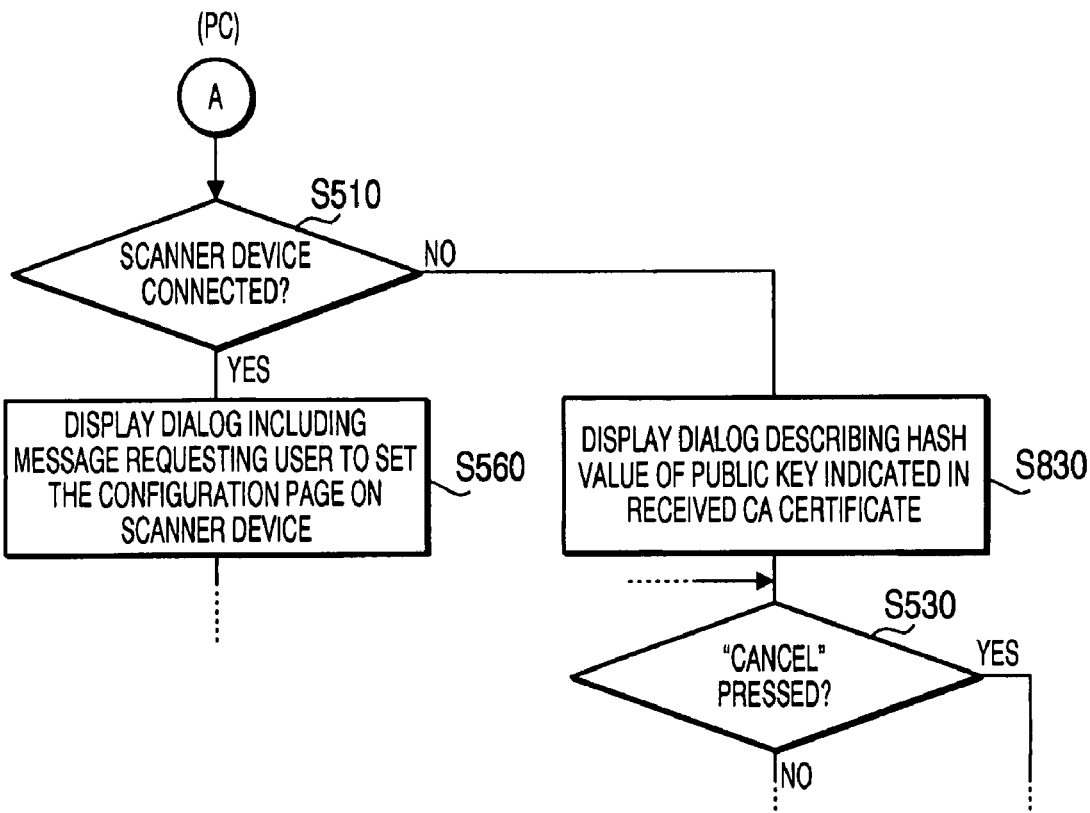
FIG. 12B is a flowchart illustrating a part of a certificate installation reception process executed by the PC according to the third embodiment.

FIG. 12A is a flowchart illustrating a print data generation process to be executed under control of the CPU 11 of the printing device 10 in step S140 of the main process. FIG. 12B is a flowchart illustrating a part of a certificate installation reception process executed by the PC 30 according to the third embodiment.

When the print data generation process is started, the CPU 11 calculates a hash value of the public key described in its own CA certificate (step S810). Then, the CPU 11 generates print data containing the device configuration and a hash value of the public key in the CA certificate (step S820). Then, the print data generation process terminates. Consequently, the configuration page describing the device configuration and the hash value of the public key of the CA certificate is printed.

When the certificate installation reception process is started, the CPU 31 of the PC 30 executes the steps S410 to S500 shown in FIG. 6. Then, in step S510, the CPU 31 judges whether the scanner device 50 is connected to the USB interface 41. When the scanner device 50 is not connected to the USB interface 41 (S510: NO), the CPU 31 displays a dialog in which a hash value of the public key described in the CA certificate obtained from the printing device 10 through the communication interface 35 is described (step S830). More specifically, the CPU 31 generates image data representing the hash value of the public key described in the CA certificate received from the printing device 10 through a dialog display program provided by an OS (Operating System), and displays an image corresponding to the generated image data on the display unit 39.

In the dialog displayed on the display unit 39 in step S830, only the hash value of the public key is displayed in contrast to displaying all the codes of the public key as shown in FIG. 9A. After step S830 is finished, steps from step S530 are processed as in the case of the first embodiment. When the scanner device 50 is connected to the USB interface 41 (S510: YES), steps from step S560 are processed as in the case of the first embodiment.

As described above, according to the third embodiment, print data representing the hash value of the public key is generated by the printing device 10, while the hash value of the public key in the CA certificate received through the network is displayed.

Therefore, the user is able to check the matching between the CA certificate stored on the sender and the CA certificate received by the PC 30 by simply checking the hash value printed on the configuration page against the hash value displayed on the display unit 39.

Although the present invention has been described in considerable detail with reference to certain preferred embodiments thereof, other embodiments are possible.

For example, the public key may be represented on the configuration page such that the randomly selected codes are expressed in a specific color different from the color of the unselected codes, although in the second embodiment the randomly selected codes are represented in the specific font which is different from the normal font of the unselected codes.

In the above mentioned embodiments, the explanation of the communication system is made in regard to a self-sign type server certificate. It is understood that the above mentioned technique for providing the self-sign type certificate can be applied to the case where a client certificate is issued for the PC 30, or the case where a CA certificate (i.e., which is not a self-sign type CA certificate) generated by the printing device 10 is transmitted to the PC 30.

What is claimed is:

1. A communication system in which a network device and an information processing device are communicably connected to each other through a network, the network device comprising:

a certificate providing unit configured to transmit an electronic certificate for certifying identity of the network device to the information processing device through the network; and a printing unit configured to generate a print image regarding a public key described in the electronic certificate and print the print image regarding the public key, wherein the print image regarding the public key represents the public key described in the electronic certificate, and wherein the print image regarding the public key includes images in which a predetermined number of codes randomly selected from a plurality of codes forming the public key are visually distinguished from codes other than the predetermined number of codes, the information processing device comprising:

a certificate reception unit configured to receive the electronic certificate from the certificate providing unit of the network device through the network;
an image output unit configured to generate a display image regarding the public key described in the electronic certificate received and output the display image regarding the public key; and
an installation unit configured to install the electronic certificate onto the information processing device in response to a fact that the display image regarding the public key is output by the image output unit and a command for installation of the electronic certificate is received.

2. The communication system according to claim 1, wherein: the information processing device comprises a user interface to be operated by a user; and the command for installation of an electronic certificate is inputted to the information processing device through the user interface.

3. The communication system according to claim 1, wherein the image output unit displays the image regarding the public key described in the electronic certificate.

4. The communication system according to claim 1, wherein: the printing unit prints a hash value of the public key described in the electronic certificate, as the image of the public key; and the image output unit generates a hash value of the public key described in the electronic certificate received by the certificate reception unit, as the image regarding the public key.

5. The communication system according to claim 1, wherein the printing unit prints the image regarding the public key in such a manner that a predetermined number of codes randomly selected from all of codes forming the public key are highlighted relative to unselected codes of the public key.

6. The communication system according to claim 1, wherein the printing unit prints the image regarding the public key in such a manner that codes forming the public key are divided into a plurality of code strings.

7. The communication system according to claim 5, wherein the printing unit prints the image regarding the public key in such a manner that each of the selected codes is assigned a mark.

8. The communication system according to claim 5, wherein the printing unit prints the image regarding the public key in such a manner that each of the selected codes is assigned a specific character attribute which is different from a character attribute of unselected codes.

9. A communication system in which a network device and an information processing device are communicably connected to each other through a network, the network device comprising:
a certificate providing unit configured to transmit an electronic certificate for certifying identity of the network device to the information processing device through the network; and
a printing unit configured to print an image regarding a public key described in the electronic certificate, the information processing device comprising:
a certificate reception unit configured to receive the electronic certificate from the certificate providing unit of the network device through the network;
a reading unit configured to optically read an image from an original; an information obtaining unit configured to obtain information concerning the public key from the image which is read by the reading unit from a printed medium on which the image of the public key is printed by the printing unit of the network device, the printed medium being set on the reading unit as the original;
a judgment unit configured to judge whether the public key described in the electronic certificate received by the certificate reception unit matches the public key represented by the information obtained by the information obtaining unit; and
an installation unit configured to install the electronic certificate onto the information processing device in response to a fact that the judgment unit judges that the public key described in the electronic certificate received by the certificate reception unit matches the public key represented by the information obtained by the information obtaining unit.

10. A network device for use with an information processing device on a network, comprising:
a communication interface that interfaces the network device with the network; a certificate providing unit configured to transmit an electronic certificate for certifying identity of the network device to the information processing device through the communication interface; and
a printing unit configured to generate a print image regarding a public key described in the electronic certificate and print the print image regarding the public key,
wherein the print image regarding the public key represents the public key described in the electronic certificate, and
wherein the print image regarding the public key includes images in which a predetermined number of codes randomly selected from a plurality of codes forming the public key are visually distinguished from codes other than the predetermined number of codes.

11. The network device according to claim 10, wherein the printing unit prints a hash value of the public key corresponding to the electronic certificate, as the image regarding the public key.

12. The network device according to claim 10, wherein the printing unit prints the image regarding the public key in such a manner that a predetermined number of codes randomly selected from all of codes forming the public key are highlighted relative to unselected codes of the public key.

13. The network device according to claim 10, wherein the printing unit prints the image regarding the public key in such a manner that codes forming the public key are divided into a plurality of code strings.

14. The network device according to claim 12, wherein the printing unit prints the image regarding the public key in such a manner that each of the selected codes is assigned a mark.

15. The network device according to claim 12, wherein the printing unit prints the image regarding the public key in such a manner that each of the selected codes is assigned a specific character attribute which is different from a character attribute of unselected codes.

16. A computer readable storage device having computer readable instruction stored thereon, which, when executed by a processor of a network device for use with an information processing device on a network, configures the processor to perform the steps of:
transmitting an electronic certificate for certifying identity of the network device to the information processing device through the network;
generating a print image regarding a public key described in the electronic certificate;
and printing the print image regarding the public key,
wherein the print image regarding the public key represents the public key described in the electronic certificate, and
wherein the print image regarding the public key includes images in which a predetermined number of codes randomly selected from a plurality of codes forming the public key are visually distinguished from codes other than the predetermined number of codes.

17. An information processing device connectable with a network, comprising:

a certificate reception unit configured to receive an electronic certificate from an external device through the network;

a reading unit configured to optically read an image from an original; an information obtaining unit configured to obtain information concerning a public key described in the electronic certificate from the image which is read by the reading unit from a printed medium on which the image regarding the public key is printed, the printed medium being set on the reading unit as the original;

a judgment unit configured to judge whether the public key described in the electronic certificate received by the certificate reception unit matches the public key represented by the information obtained by the information obtaining unit; and an installation unit configured to install the electronic certificate onto the information processing device in response to a fact that the judgment unit judges that the public key described in the electronic certificate received by the certificate reception unit matches the public key represented by the information obtained by the information obtaining unit.

* * * * *